NEAL A. PATTON
INVENTOR.

BY
Robert K. Rhea
AGENT

NEAL A. PATTON
INVENTOR.

BY
Robert K. Rhea
AGENT

Oct. 12, 1965
N. A. PATTON
3,211,236
SUBSOIL TILLER
Filed Oct. 14, 1963
8 Sheets-Sheet 4
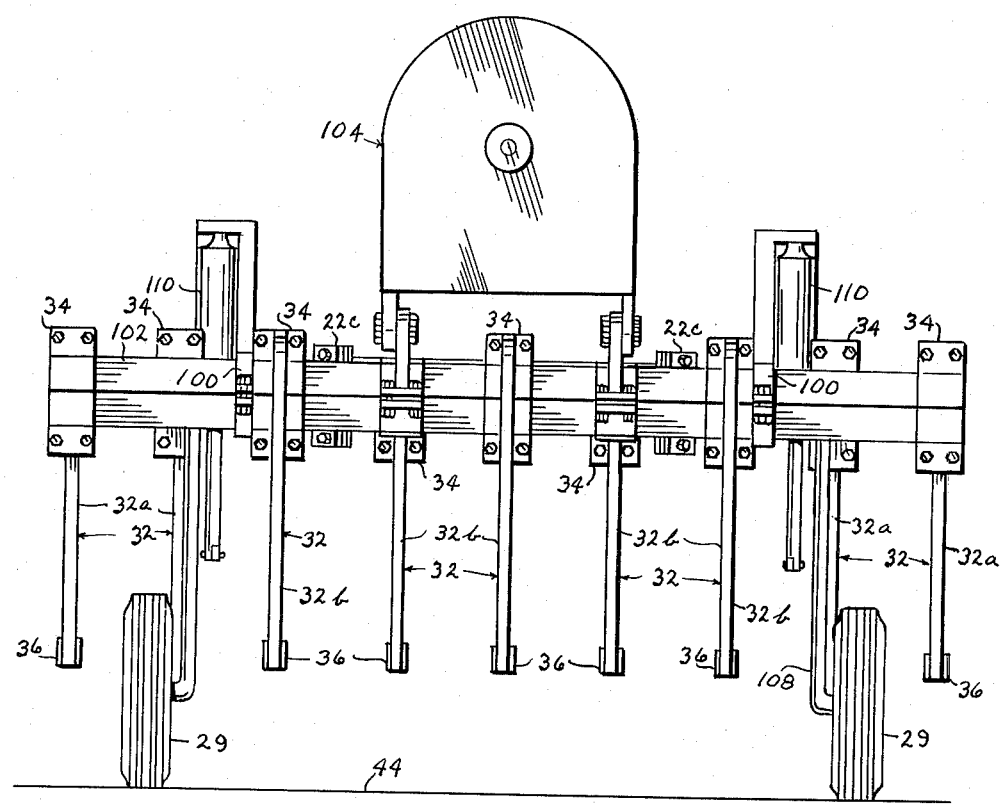
FIG. 11
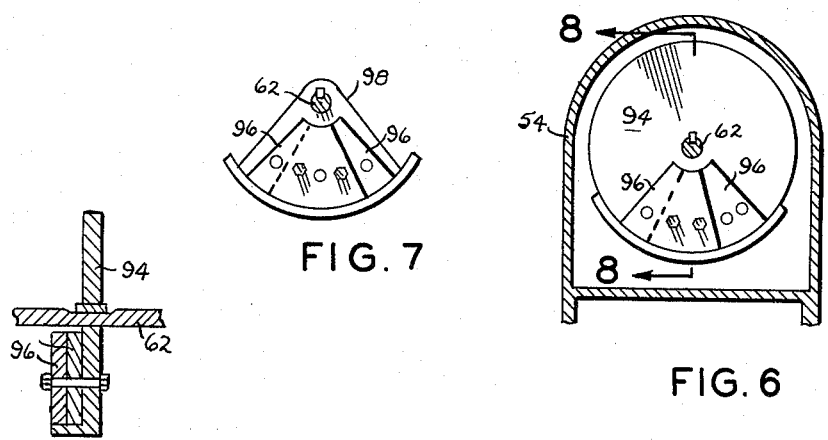
FIG. 7
FIG. 8
FIG. 6
NEAL A. PATTON
*INVENTOR.*
BY
*Robert K. Rhea*
AGENT

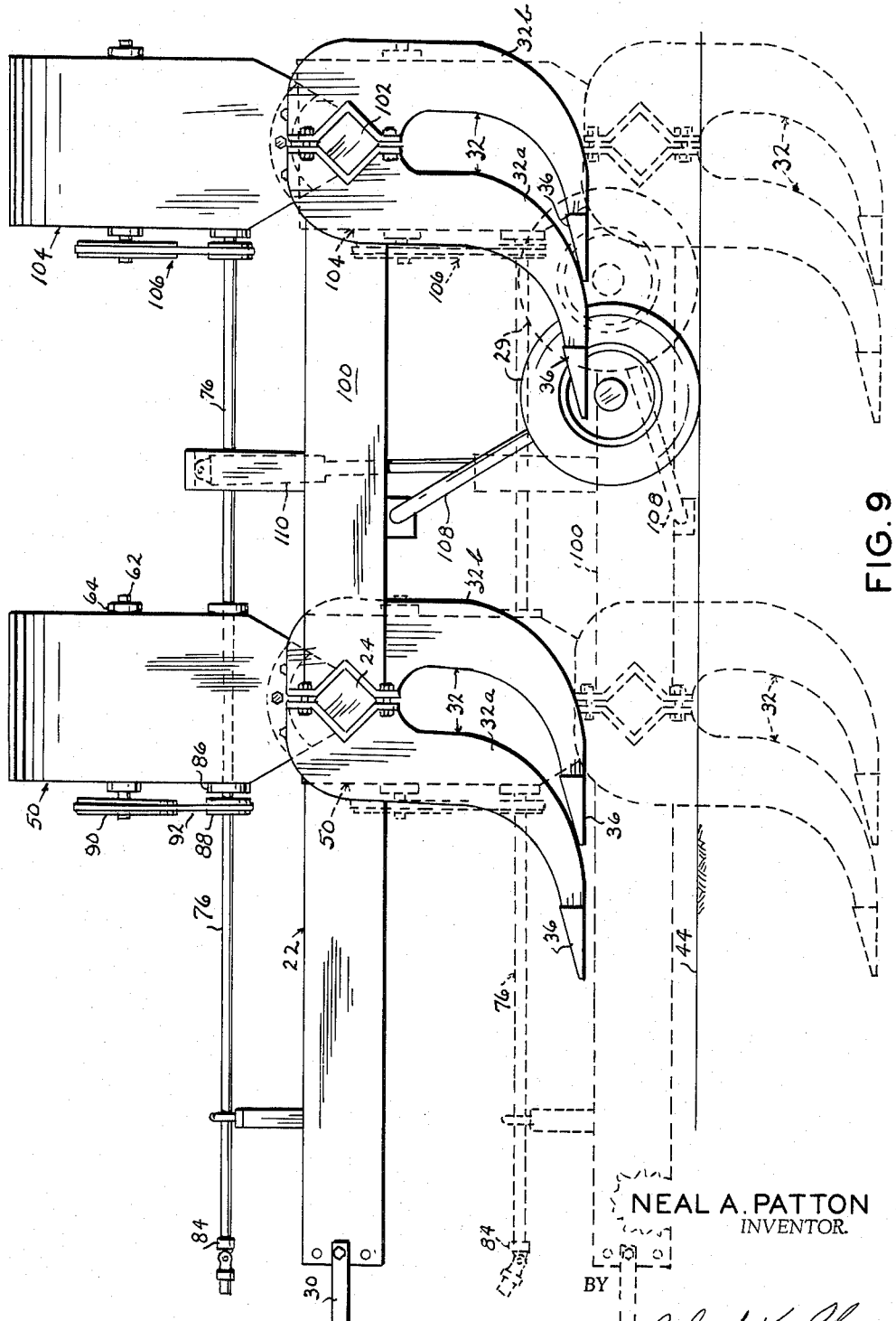

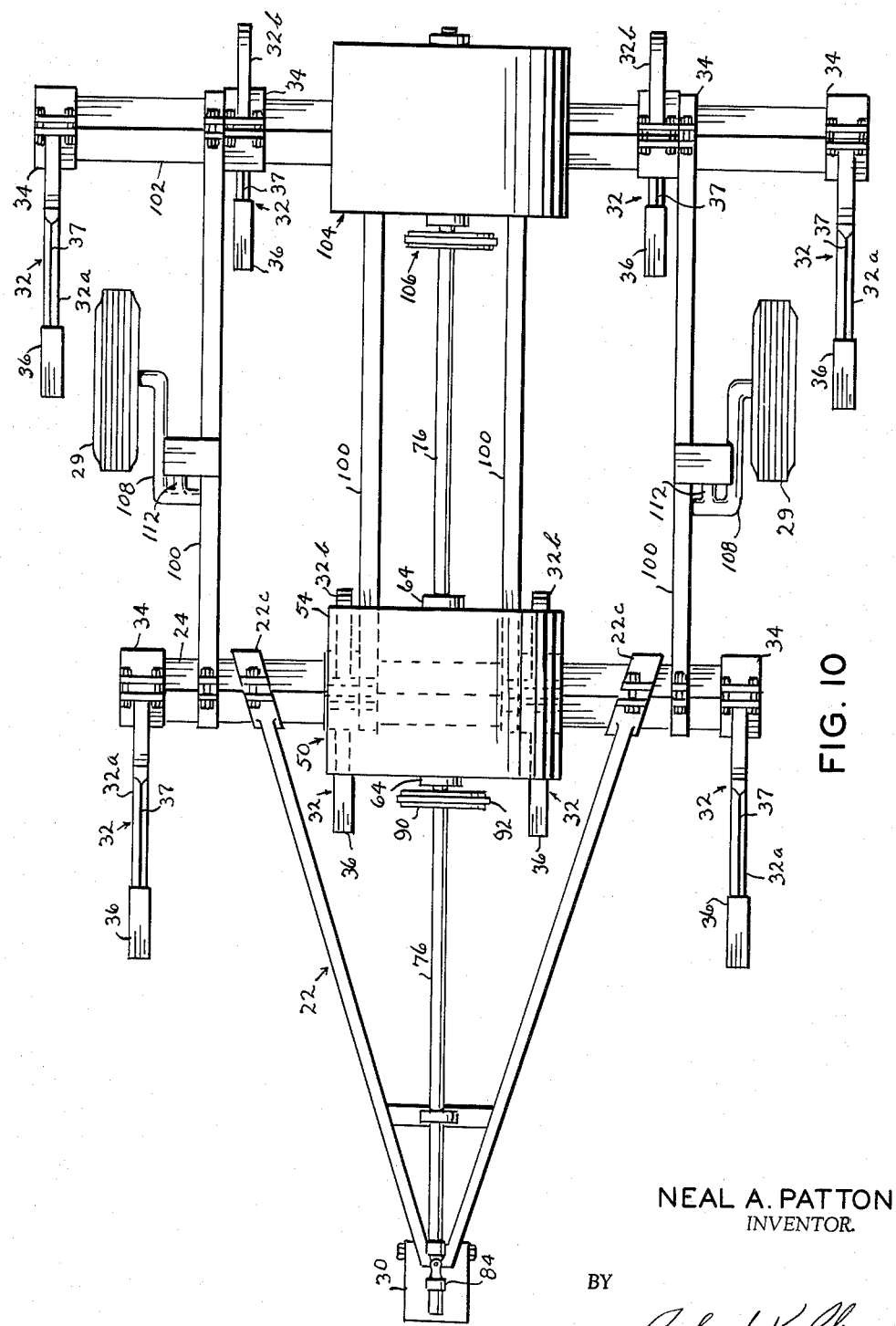

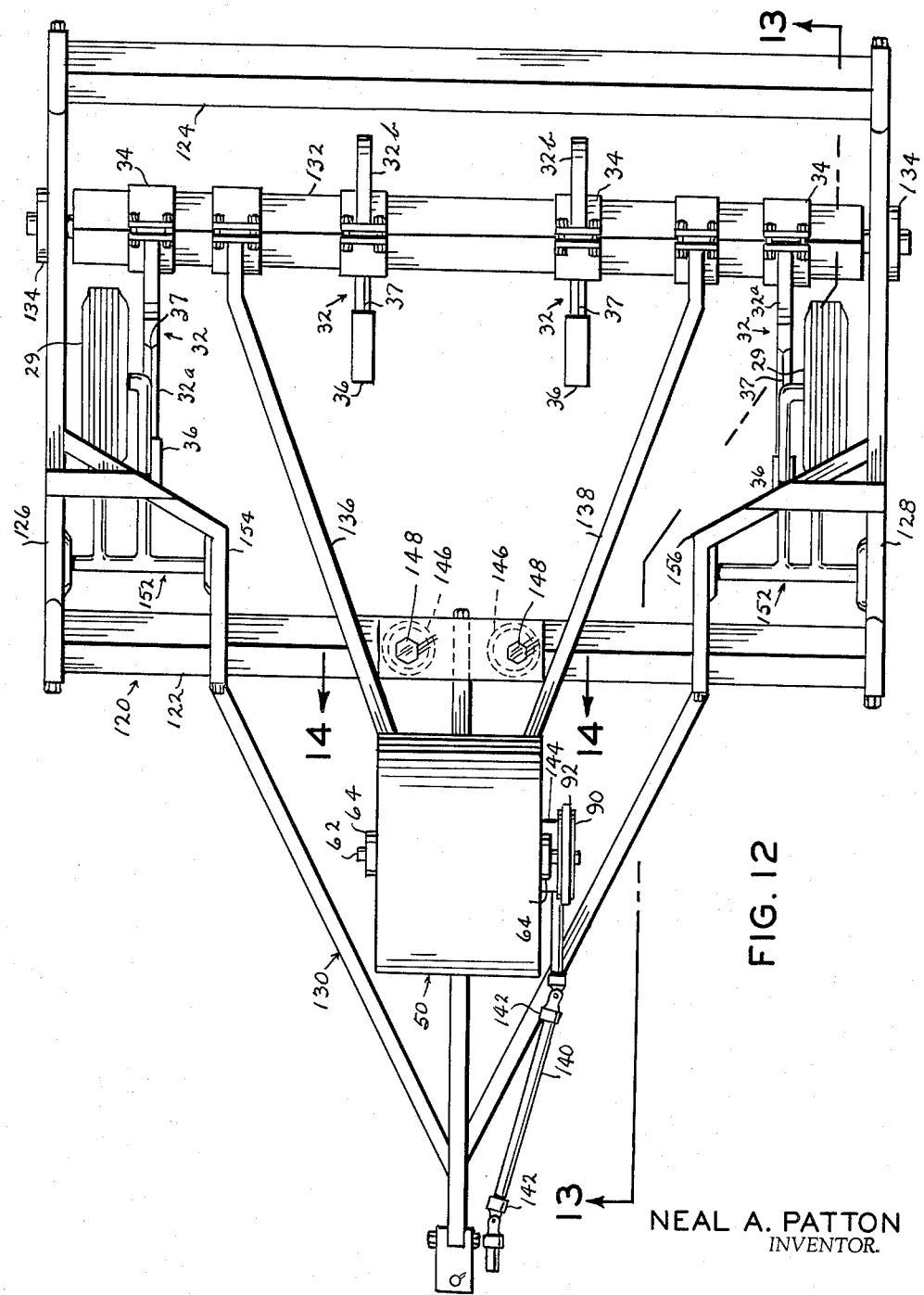

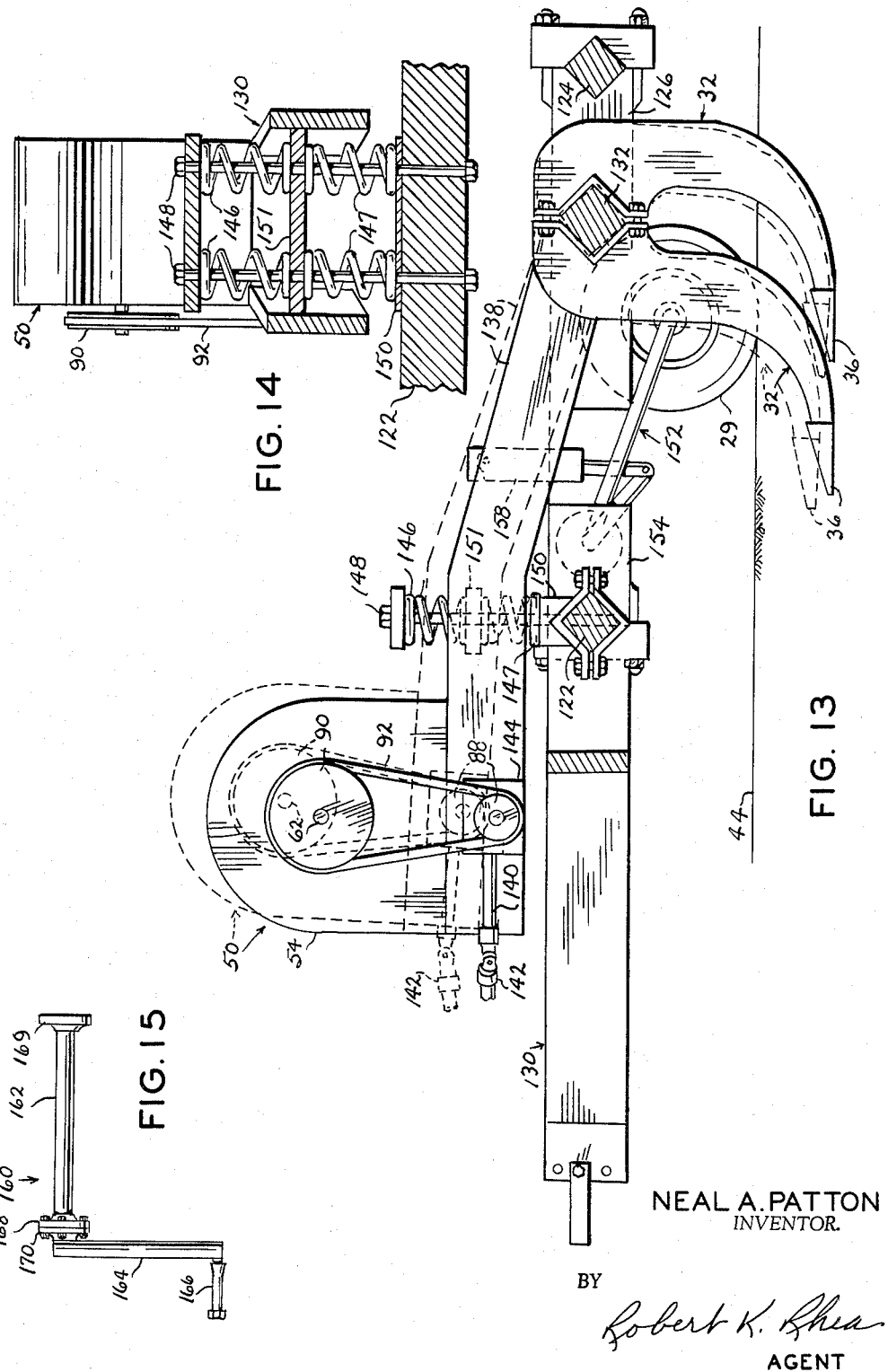

United States Patent Office 3,211,236
Patented Oct. 12, 1965

3,211,236
SUBSOIL TILLER
Neal A. Patton, Box 468, Perryton, Tex.
Filed Oct. 14, 1963, Ser. No. 315,774
6 Claims. (Cl. 172—40)

The present invention relates to farming implements and more particularly to a subsoil tiller.

Subsoilers or tillers generally comprise a wheel supported frame towed by a tractor, or the like, wherein a plurality of teeth or earth penetrating chisels are positioned for entering the earth in spaced-apart relation. The teeth extend downwardly from the surface of the earth a substantial distance to loosen or break up the "hard pan" or soil below the level normally tilled in planting and cultivating crops. Since the chisels or blades used in subsoil tilling extend a substantial distance into the earth, considerable power is required to pull a subsoiler having a plurality of chisels connected thereto.

It is, therefore, the principal object of the instant invention to provide a subsoil tiller which features a vibrator or eccentric device which will impart an oscillating action to the earth engaging chisels while the latter are drawn through the earth.

A similarly important object is to provide a subsoil tiller wherein the vibrator means, connected with the pneumatic tired wheel supported frame of the subsoiler, imparts an oscillating action to the frame and chisels so that the chisels may be more easily pulled through the soil thus permitting a greater number of chisels to be used without a proportional increase of power for the added chisels.

Another object is to provide a subsoil tiller having the free tip end portions of the earth engaging teeth arranged in forward and rearward staggered relation so that the device may be more easily drawn through the soil.

A further object is to provide a device of this class which features a horizontal tooth supporting tool bar which may be oscillated about its horizontal axis to provide vertical reciprocating movement of the forward end portions of the teeth as they are drawn through the soil.

Still another object is to provide a device of this class wherein eccentrically mounted weights, forming a part of the vibrator, are adjustable with respect to their support for increasing and decreasing the degree of vibration.

Still another object is to provide a subsoil tiller having a vibrator wherein the vibrator is mounted directly above a horizontal tooth supporting tool bar whereby the vibrator may be adjustably positioned on its support to direct the resulting vertically reciprocating action toward the position of the downwardly and forwardly disposed end portions of the teeth.

Yet another object is to provide a device of this class which features an improved axle of rugged construction for connecting the pneumatic tired supporting wheels to the frame of the device.

The present invention accomplishes these and other objects by providing a wheel supported frame which is connected at its rearward ends to a horizontally disposed teeth supporting tool bar and mounting a vibrator means above the tool bar. Hydraulic means, connected with wheel supporting axles regulates the earth penetrating depth of the teeth.

Other objects will be apparent from the following description when taken in conjunction with the accompanying eight sheets of drawings, wherein:

FIGURE 6 is a view similar to FIG. 4 illustrating an alternate embodiment of the vibrator;

FIGURE 7 is another alternate embodiment of the vibrator;

FIGURE 8 is a vertical cross-sectional view taken substantially along the line 8—8 of FIG. 6;

FIGURE 9 is a side elevational view similar to FIG. 1 illustrating an alternate embodiment of the device;

FIGURE 10 is a top plan view of FIG. 9;

FIGURE 11 is a rear end elevational view of FIGS. 9 and 10;

FIGURE 12 is a top plan view of another alternate embodiment of the device;

FIGURE 13 is a side elevational view, partly in section, taken substantially along the line 13—13 of FIG. 12;

FIGURE 14 is a vertical cross-sectional view taken substantially along the line 14—14 of FIG. 12; and, FIGURE 15 is an elevational view of a preferred axle construction.

Like characters of reference designate like parts in those figures of the drawings in which they occur.

In the drawings:

Figure 1:
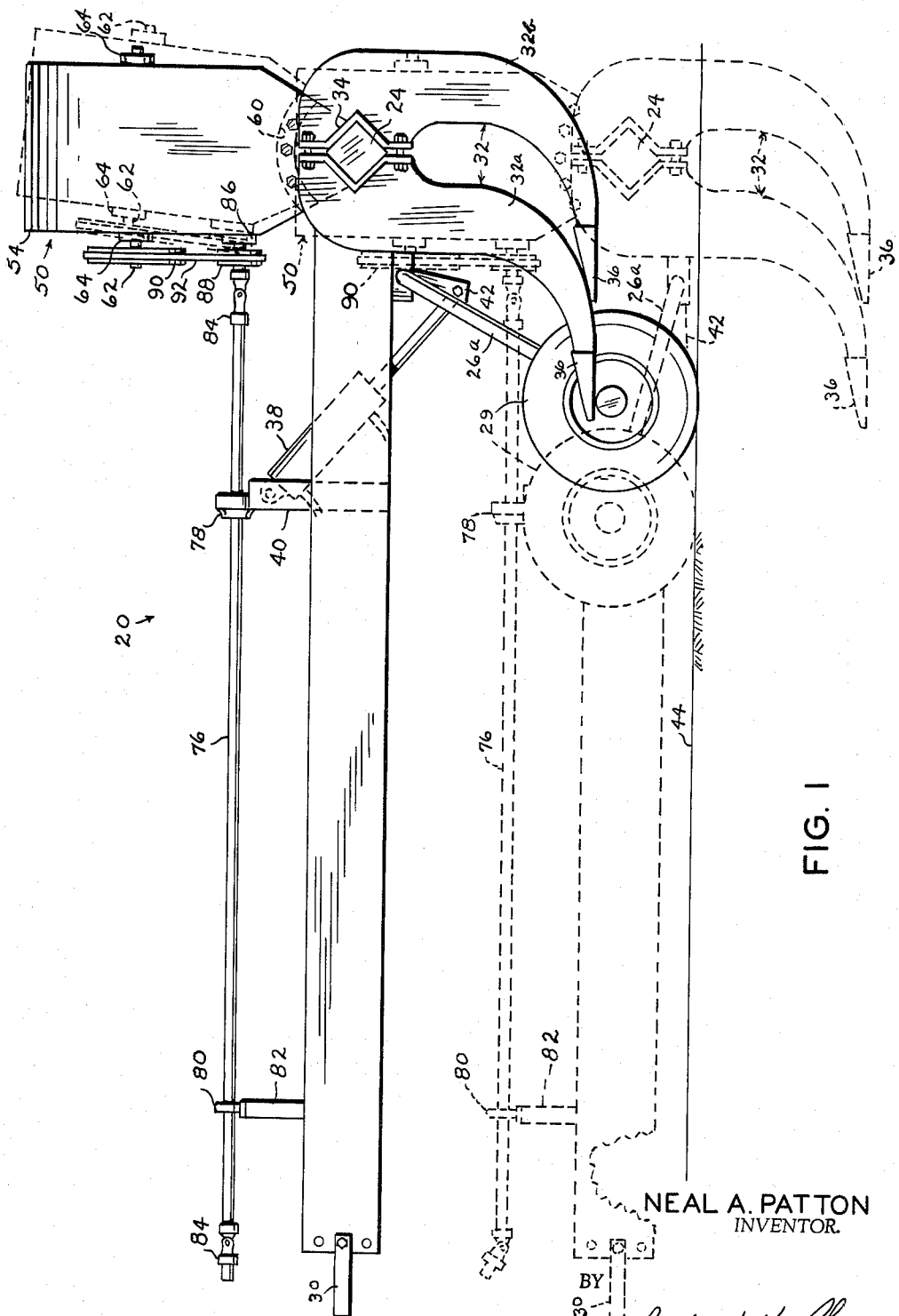
FIGURE 1 is a side elevational view of the device illustrating, by dotted lines, its position when in earth ripping position.
Figure 2:
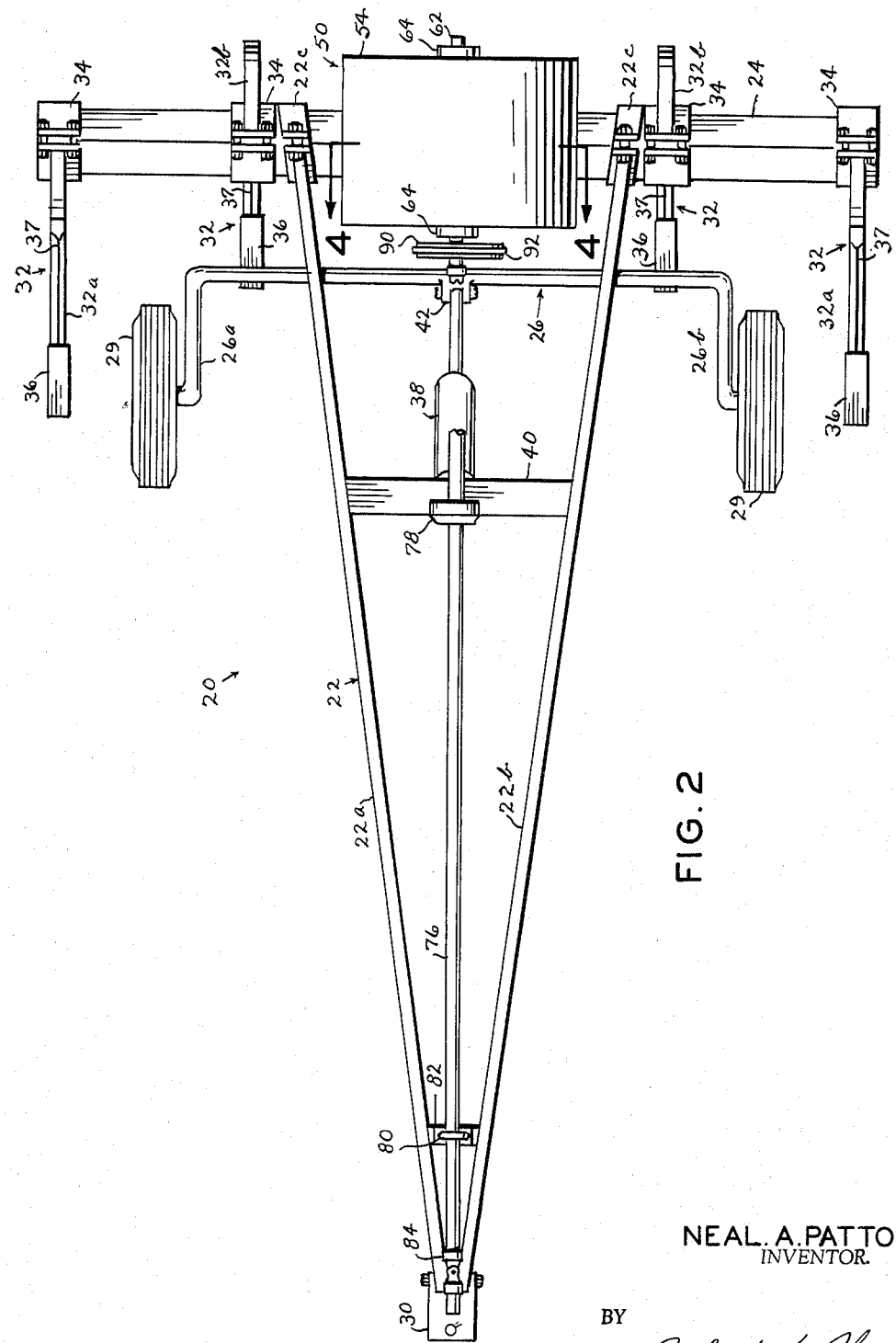
FIGURE 2 is a top plan view of FIG. 1.
Figure 3:
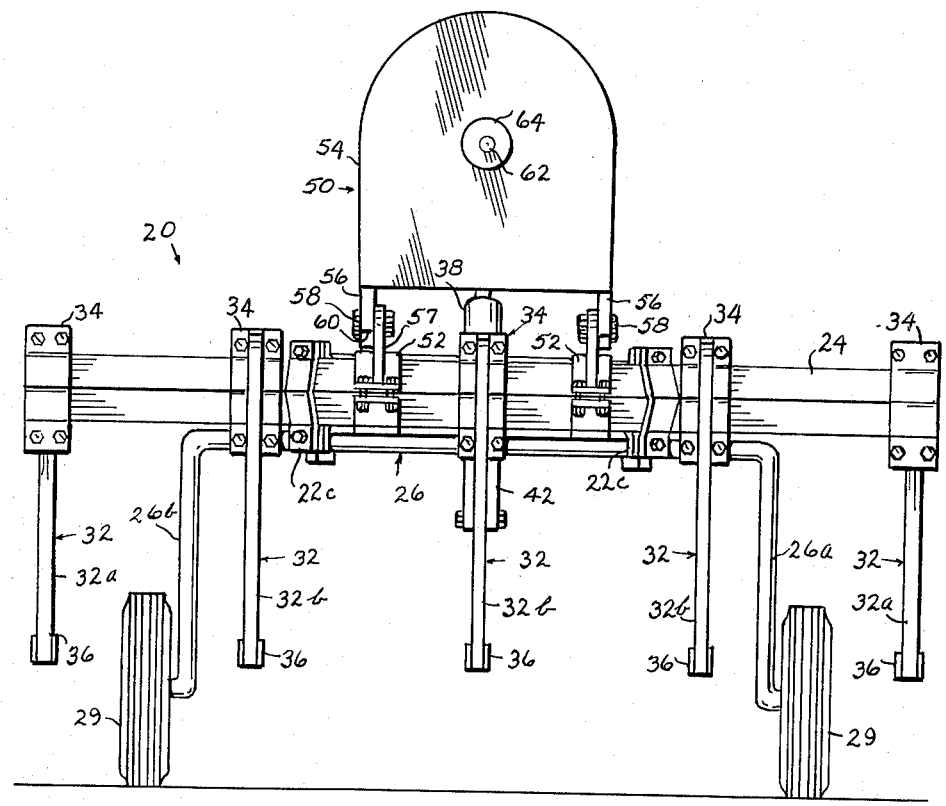
FIG. 3 is a rear end elevational view of FIGS. 1 and 2.

Referring more particularly to FIGS. 1 to 3, the reference numeral 20 indicates the device, as a whole, including a frame or beam 22 connected at one end to a horizontal tool bar 24. The beam includes a pair of members 22a and 22b connected together at their forward ends and connected at their rearward ends to the tool bar 24 in spaced-apart relation by clamps 22c. The tool bar 24 is preferably square in cross section for the purposes which will presently be apparent.

A horizontal axle 26 is transversely connected to the lower edge portion of the beam members 22a and 22b in forward parallel spaced relation with respect to the tool bar 24. The respective end portions 26a and 26b of the axle 26 are turned downwardly and outwardly for journaling pneumatic tired wheels 29 on their respective end portions which support the device in a mobile manner. A suitable connector plate 30, pivotally connected to the forward end of the beam 22, is adapted for connection with a power driven unit, such as a tractor, not shown.

A plurality of chisels or teeth 32 are connected in depending relation by clamp members 34 to the tool bar. The teeth 32 are substantially rectangular in cross section with their forward and rearward edge surface converging downwardly and arcuately forward of the plane defined by the lower surface of the beam 22 and terminate with their lowermost forward surface positioned in a horizontal plane. The teeth are each provided, at their forwardly projecting end portion, with an earth cutting hardened shoe or plate 36. The depending forwardly disposed edge of each tooth 32 is sharpened, as at 37. The upper end portions of the outermost teeth 32a are positioned on and extend forwardly of the forward side surface of the tool bar 24 while the intermediate teeth 32b are connected to and extend rearwardly of the rearward side surface of the tool bar so that the forwardly projecting tip or shoe 36, on the respective teeth 32a and 32b, are positioned in forwardly and rearwardly off-set relation. I have found this desirable in that the outermost teeth 32a, when performing the subtilling or earth ripping function, loosen the subsoil to such an extent that the intermediate teeth 32b are more easily pulled through the soil thus eliminating the necessity of the use of a tractor of relatively high horse power. A hydraulic cylinder 38 is conventionally connected to the hydraulic system of the towing tractor by tubing, not shown. The hydraulic cylinder 38 is connected at one end to a transverse frame brace 40 and connected at its other end to a depending arm 42 rigidly connected to the axle 26 intermediate the latter's ends for rotating the axle 26 about its horizontally disposed axis to raise and lower the axle arm or end portions 26a and 26b and thus raise or lower the device with respect to the surface of the earth indicated by the line 44.

Figures 4, 5:
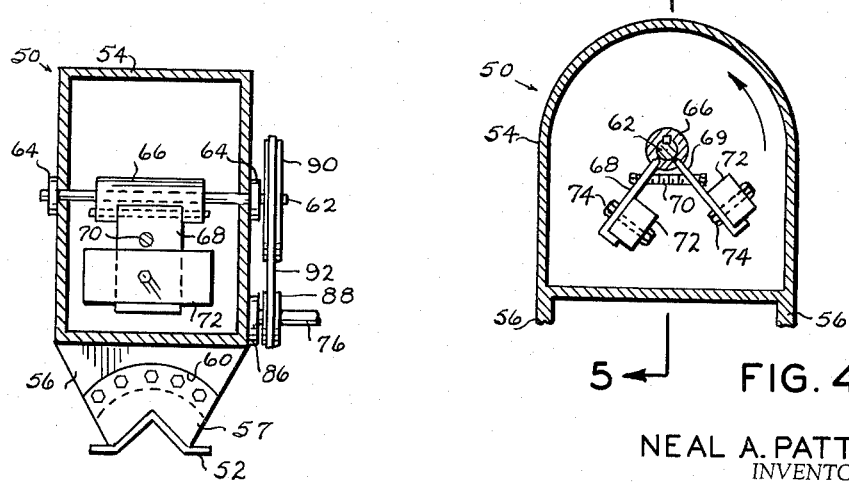
FIGURE 4 is a vertical cross-sectional view taken substantially along the line 4—4 of FIG. 2.
FIGURE 5 is a vertical cross-sectional view taken substantially along the line 5—5 of FIG. 4.

Referring also to FIGS. 4 and 5, vibrating means, indicated generally by the numeral 50, is mounted by suitable clamp members 52 on the tool bar 24 medially its ends. The vibrating means 50 includes a closed housing 54 having depending divided supports 56 and 57. The vibrator housing supports 56 and 57 are connected by bolt means 58 along an arc 60 having a center common to the tool bar 24 so that the housing 54 may be adjustably tilted forwardly or rearwardly along the arc 60, as shown by the rearward dotted line position (FIG. 1), so that the vertical reciprocating force of the vibrating action will be directed toward the tip end portions of the teeth 32. The housing 54 is centrally provided with a horizontal axle 62 journaled by suitable bearings 64 secured to the opposing end walls of the housing.

A cylindrical connector 66 surrounds and is keyed to the axle 62 intermediate its ends for rotation therewith. A pair of arms 68 and 69, L-shaped in side elevation, are pivotally connected in radially spaced relation to the connector 66 by the free end portion of the leg portion of the respective L-shaped arm. An adjusting bolt 70 extends through the leg portion of each arm for maintaining the arms 68 and 69 in a desired spaced-apart relation for the reasons more fully explained hereinbelow. A weight 72, rectangular in shape, is positioned upon the foot portion of each respective arm and is connected to the leg portion thereof by bolt means 74. Thus the connector 66, arms 68–69 and weights 72 form an eccentric to impart vibratory action to the housing 54 which in turn imparts the vibrating movement to the tool bar 24 and teeth 32.

A driving shaft 76 extends along the upper surface of the beam 22 in parallel spaced relation and is journaled by bearings 78 and 80 mounted, respectively, on the support 40 and a similar forward support 82. Universal joints or connectors 84 form a part of the shaft 76 for the reasons which will readily be apparent. The forward end of the shaft 76 is connected with the tractor power take off, not shown, for rotating the shaft. The rearward end portion of the shaft is journaled by a bearing 86 mounted on the forward surface of the housing 54. Pulleys 88 and 90 are connected to the shafts 76 and 62, respectively, while a belt 92, entrained around the pulleys, imparts rotation to the shaft 62 for moving the weights 72 in the direction shown by the arrow (FIG. 4).

FIGURES 6, 7 and 8, illustrate an alternate embodiment of the vibrator wherein the eccentric comprises a disk 94 axially mounted on the shaft 62 and provided with a pair of radially positioned overlapping weights 96 which may be adjusted around the disk for increasing or decreasing the vibrating action of the vibrator. Alternatively the disk 94 may comprise only a fragment of a disk, as at 98, (FIG. 7), to increase the eccentric action in combination with the weights 96.

Referring now more particularly to FIGS. 9, 10 and 11, an alternate embodiment of the device is shown, and comprises the frame 22, tool bar 24, teeth 32 and vibrating means 50. Rearwardly extending spaced-apart beam members 100 are connected at their forward ends to the tool bar 24 and connected at their rearward ends to a second tool bar 102, substantially longer than the tool bar 24, so that a plurality of the teeth 32 may be connected to the respective ends and intermediate portions of the tool bar 102 in offset staggered relation with respect to the path of travel of the teeth connected with the tool bar 24. Similarly, a second vibrator 104 is mounted on the tool bar 102. The drive shaft 76 is extended rearwardly through the forward vibrator 50 and similarly connected to the rearward vibrator by belt and pulley means 106. The wheels 29 are mounted by substantially Z-shaped axles 108 to the outermost one of the beam members 100 and are similarly raised and lowered by hydraulic cylinders 110 connected with the frame 100 and axle arm members 112.

Referring now more particularly to FIGS. 12, 13 and 14, the numeral 120 indicates a rectangular frame which includes forward and rearward horizontally disposed tool bars 122 and 124, and beam members 126 and 128. The beams 126 and 128 are connected at their respective ends to the respective ends of the tool bars 122 and 124 to form the sides of the frame. A substantially A-shaped beam or tractor connecting means 130 is connected to the forward tool bar 122 for connection with the towing tractor as described hereinabove. A similarly horizontal tool bar 132 extends between the frame sides 126 and 128 and is pivotally mounted axially by bearings 134 mounted on the respective frame sides for a to and fro pivoting movement of the tool bar 132 about its horizontal axis. Forwardly converging beam members 136 and 138 are connected in spaced-apart relation to the tool bar 132. The beams 136 and 138 support, at their forwardly disposed spaced-apart ends, one of the vibrators 50. The vibrator 50 is rotated 90° from its position shown in FIGS. 1, 2 and 3, so that its shaft 62 is positioned parallel to the tool bars 122, 124 and 132, so that, when the eccentric means is rotated, a vertically reciprocating action will be imparted to the forward end portions of the beams 136 and 138. A drive shaft 140, provided with suitable universal joints 142, is connected to the pulleys 88 and 90 through a gear train 144.

Two pairs of relatively heavy helical spring members 146 and 147 are vertically mounted in superposed relation by bolts 148 on the tool bar 122 between the beams 136 and 138. A transverse brace 151 is interposed between the pairs of springs and extends between and is secured to the beams 136 and 138, so that the springs bear against the upper and lower surfaces of the brace 150 to maintain the beams 136 and 138 in spaced relation above the upper surface of the tool bar 122 for the reasons more fully explained hereinbelow. A pair of wheels 29 is monted on T-shaped axles 152 between the respective frame sides 126 and 128 and suitable brace members 154 and 156, respectively. Similarly hydraulic cylinders 158, connected with the respective T-shaped axle, raise and lower the wheels.

In this type of device the axle forms a torsion bar and is subjected to considerable strain and frequently causes maintenance problems as a result of the vibrating action. A preferred form of an improved three piece heavy duty axle is illustrated in FIG. 15 and indicated generally by the numeral 160. The axle is formed of three sections 162, 164 and 166. The horizontal section 162 and the shank section 164 are preferably formed from relatively thick walled tubular material. Flanges 168 and 169 are rigidly connected axially to the respective ends of the section 162 and a similar flange 170 is connected to one end portion of the axle shank section 164. The flange 169 is rigidly connected to one side of the frame of the device, for example, the beam 100 (FIG. 10). The wheel supporting section or spindle 166 may be similarly connected by a flange to the other end of the shank portion 164 or welded thereto as shown. The flanges 168 and 170 are bolted together in a conventional manner thus permitting the angular position of the shank section 164 to be adjusted as desired by rotating the flange 170 relative to the flange 168.

OPERATION

By way of example the operation of the device illustrated by FIGS. 1 to 8 will be described. The connector plate 30 is connected with the tractor tow bar, not shown, and the tractor power take-off is connected to the drive shaft 76. The tractor hydraulic controls are conventionally connected to the hydraulic cylinder 38. The hydraulic cylinder 38 maintains the wheels 29 in extended frame supporting position, as shown by solid lines (FIGS. 1 and 3), while moving the device to position in the field. The hydraulic cylinder 38 is actuated to rotate the axle 26 and lift the axle shank portions 26a and 26b, with respect to the horizontal plane of the frame 22, thus permitting the teeth 32 to engage and penetrate the surface of the earth 44. The tractor pulls the device forwardly while the power take-off rotates the drive shaft 76 thus generating, by the vibrating means 50, an oscillating motion to impart a lateral and up and down movement to the tool bar 24 and the teeth or chisels 32. As explained hereinabove, the outermost teeth 32a, positioned forwardly of the teeth 32b, tend to permit easier movement of all of the teeth through the soil. Positioning the vibrating means 50 on the tool bar 24 transmits substantially all of the vibrating action to the teeth 32 and thus prevents undue stress and strain which would be imparted to the frame if the vibrating means is mounted on the frame forwardly of the tool bar 24. The pneumatic tires, forming a part of the wheels 29, absorb a portion of the shock of the vibrator and the resistance of the axle 26 acting as a torsion bar creates a spring-like effect for an up and down movement of the device as a result of the rotating eccentric means within the vibrator 50. The greatest oscillating motion is obtained by positioning the weights, illustrated in FIGS. 4, 5, 6 and 7, in close proximity. When it is desired to lessen the vibrating action, as when ripping relatively loose soil, the respective weights are positioned in selected radially spaced position to lessen the vibrating action.

The operation of the device illustrated by FIGS. 9, 10 and 11, is similar to the above description but the resulting soil ripping action is increased by the staggered position of the respective forward and rearward rows of teeth. The vibrating means 50 and 104 may be synchronized to achieve the greatest degree of movement of the tip end portions of the teeth.

The operation of the alternate embodiment, illustrated in FIGS. 12 and 13, is similar in most respects to the above description except that the vibrating means 50, is mounted on the beam members 136 and 138 with the axis of rotation of the eccentric means parallel to the longitudinal axis of the tool bar 132. This generates an up and down oscillating action to the beam members 136 and 138 to raise the latter, in cooperation with the springs 147, while the springs 146 resist such lifting action thus imparting an up and down movement to the tip end portions of the teeth 32. The downwardly directed forces applied to the beams 136 and 138 is cushioned by the springs 147. This oscillating action permits the teeth to be more easily drawn through the soil.

Obviously the invention is susceptible to some change or alteration without defeating its practicability, and I therefore do not wish to be confined to the preferred embodiment shown in the drawings and described herein, further than I am limited by the scope of the appended claims.

I claim:
1. A subsoil tiller, comprising: a generally fore and aft extending beam including a pair of members connected together at their front ends and spaced-apart at their rear ends; a forward tool bar transversely connected with and extending, at its opposing ends, beyond the rearward end portions of said pair of members; side members connected with the respective ends of said forward tool bar and extending rearwardly in spaced parallel relation; a rearward tool bar extending between and connected with said side members; an intermediate tool bar extending between and connected with said side members for oscillating rotation about a horizontal axis; convergent beams connected with said intermediate tool bar and extending forwardly above said forward tool bar; a torsion bar axle transversely connected to each said side member forwardly of said intermediate tool bar, each said axle having a depending shank end portion; a supporting wheel connected with each said axle shank end portion; means for raising and lowering said wheels with respect to the horizontal plane of said beam; earth ripping chisels connected in spaced-apart depending relation to said intermediate tool bar; and vibrator means mounted on and supported by said convergent beams forwardly of said intermediate tool bar for imparting an oscillating rotative action to said intermediate tool bar and a vertical oscillating action to the free end portions of said chisels.

2. Structure as specified in claim 1 in which said vibrating means includes a vibrator housing having opposing ends normal to the longitudinal axis of said forward tool bar; eccentric means rotatably mounted within said housing between said ends; and pulley means connected with said housing and adapted to be connected with a source of power for rotating the eccentric means.

3. Structure as specified in claim 2 in which the eccentric means includes a shaft extending between and journaled by the opposing ends of said housing; a connector secured to said shaft; at least one L-shaped arm pivotally connected by its leg portion with said connector; and a weight secured to said arm.

4. Structure as specified in claim 2 in which the eccentric means includes a shaft extending between and journaled by the opposing ends of said housing; a connector secured to said shaft; a pair of L-shaped arms pivotally connected, in radially spaced relation, by their arm portions, to said connector; a weight secured to each said arm; and means adjustably interconnecting said arms for selectively varying the eccentric action of said eccentric means when said shaft is rotated.

5. A mobile subsoil tiller, comprising: horizontally disposed frame means, said frame means including a generally fore and aft extending beam connected at its rearward end to a first tool bar, a second tool bar positioned in rearwardly spaced parallel relation with respect to the said first tool bar, side members extending between and connected with the respective end portions of said first and second tool bars; a pair of torsion bar axles connected with said frame means; a wheel mounted on each said axle; means for raising and lowering said wheels with respect to the horizontal plane of said frame means; an intermediate tool bar extending between and journaled by said side members for rotation about its horizontal axis; earth engaging chisels connected in depending spaced-apart relation to said intermediate tool bar; a pair of beam members connected in spaced relation to said intermediate tool bar, said pair of beam members extending angularly upwardly over said first tool bar; and vibrator means connected with the forward end portions of said pair of beam members for vertically reciprocating the forward end portions of the latter and imparting an oscillating action to the free end portions of said chisels.

6. Structure as specified in claim 5 and a transverse brace extending between said pair of beam members above said first tool bar; and spring means connected with said first tool bar between said pair of beam members and bearing against said transverse brace for cushioning the vertical reciprocating action of said pair of beam members.

References Cited by the Examiner

UNITED STATES PATENTS

| | | | |
|---|---|---|---|
| 1,844,124 | 2/32 | Jordan. | |
| 2,227,762 | 1/41 | Ronning | 267—58 |
| 2,588,918 | 3/52 | Graham | 172—413 X |
| 2,597,608 | 5/52 | Altgelt et al. | 172—699 X |
| 3,071,366 | 1/63 | Loehr | 280—124.3 X |

FOREIGN PATENTS

| | | |
|---|---|---|
| 843,456 | 3/39 | France. |
| 982,655 | 1/51 | France. |
| 369,256 | 2/23 | Germany. |
| 580,703 | 8/58 | Italy. |
| 43,610 | 1/61 | Poland. |

ABRAHAM G. STONE, *Primary Examiner.*